United States Patent
Ito et al.

[11] Patent Number: 6,014,693
[45] Date of Patent: Jan. 11, 2000

[54] SYSTEM FOR DELIVERING COMPRESSED STORED VIDEO DATA BY ADJUSTING THE TRANSFER BIT RATE TO COMPENSATE FOR HIGH NETWORK LOAD

[75] Inventors: Teruaki Ito; Gyota Yasoda, both of Tokyo, Japan

[73] Assignee: Mitsubishi Denki Kabushiki Kaisha, Tokyo, Japan

[21] Appl. No.: 08/712,844

[22] Filed: Sep. 12, 1996

[30] Foreign Application Priority Data

Mar. 29, 1996 [JP] Japan .................................. 8-077494

[51] Int. Cl.⁷ .................................. H04N 7/14; H04H 1/02
[52] U.S. Cl. .................................. 709/219; 348/7; 348/12; 348/13; 455/4.2; 455/5.1
[58] Field of Search .................................. 348/1, 3, 7, 8, 348/12, 13, 6, 10, 700; 707/102, 104, 201; 395/200.33, 200.47, 200.49; 455/3.1, 4.1, 4.2, 5.1, 6.1; 709/217–219; 370/395, 474, 476; H04N 7/10, 7/14

[56] References Cited

U.S. PATENT DOCUMENTS

| | | |
|---|---|---|
| 5,115,429 | 5/1992 | Hluchyj et al. . |
| 5,136,655 | 8/1992 | Bronson . |
| 5,371,547 | 12/1994 | Siracusa et al. . |
| 5,404,505 | 4/1995 | Levinson . |
| 5,521,630 | 5/1996 | Chen et al. .................................. 348/7 |
| 5,604,731 | 2/1997 | Grossglauser et al. . |
| 5,612,949 | 3/1997 | Bennett . |
| 5,655,117 | 8/1997 | Goldberg et al. . |
| 5,659,539 | 8/1997 | Porter et al. .................................. 455/5.1 X |

FOREIGN PATENT DOCUMENTS

7/75092  3/1995  Japan .

Primary Examiner—John W. Miller
Attorney, Agent, or Firm—Burns, Doane, Swecker & Mathis, LLP

[57] ABSTRACT

A system for delivering video data comprises a video server (1) including a video database (11) for storing video index information (13) defining a plurality of settings for a transfer bit rate of video data and indicating which data included in original video data (12) the video server should transfer to a client (2) through a network (3) when setting the transfer bit rate to one of the plurality of settings, a video data assembler (14) for extracting data from the original video data by referring to the video data index information so as to set the transfer bit rate to one of the plurality of settings, and for reassembling the extracted data to create video data to be transferred at the set transfer bit rate to the client, while maintaining consistency in contents of the original video data, and a video data delivery unit (15) for delivering a constant amount of data at certain intervals in accordance with the set transfer bit rate in order to transfer the video data reassembled by the video data assembler to the client. Furthermore, the video server comprises a network load sensor (17) for measuring a load imposed on the network.

19 Claims, 6 Drawing Sheets

| TYPE OF ENCODING | MPEG1 |
|---|---|
| HEADER INFORMATION | SIZE |
| FRAME INFORMATION | THE NUMBER OF PICTURES WHICH CONSTRACT ONE GOP |
| ORIGINAL BIT RATE SETTING (1.5Mbps) | ALL PICTURES |
| FIRST BIT RATE SETTING (1.0Mbps) | ALL I AND P PICTURES |
| SECOND BIT RATE SETTING (768Kbps) | ALL I PICTURES, AND THREE P PICTURES FOR EVERY ONE GOP |
| . . . . | |
| Nth BIT RATE SETTING (128Kbps) | ONE I PICTURE FOR EVERY FIVE GOPS |

| | |
|---|---|
| TYPE OF ENCODING | MPEG1 |
| HEADER INFORMATION | SIZE |
| FRAME INFORMATION | THE NUMBER OF PICTURES WHICH CONSTRACT ONE GOP |
| ORIGINAL BIT RATE SETTING (1.5Mbps) | ALL PICTURES |
| FIRST BIT RATE SETTING (1.0Mbps) | ALL I AND P PICTURES |
| SECOND BIT RATE SETTING (768Kbps) | ALL I PICTURES, AND THREE P PICTURES FOR EVERY ONE GOP |
| . . . . | |
| Nth BIT RATE SETTING (128Kbps) | ONE I PICTURE FOR EVERY FIVE GOPS |

SYSTEM FOR DELIVERING COMPRESSED STORED VIDEO DATA BY ADJUSTING THE TRANSFER BIT RATE TO COMPENSATE FOR HIGH NETWORK LOAD

BACKGROUND OF THE INVENTION

1. Field of the Invention

The present invention relates to a system for delivering video data through a network.

2. Description of the Prior Art

Improvements in hardware and software techniques have provided a way to handle data such as video data, which are difficult to handle as digital data, in the same manner as in the case of numerical data. Furthermore, as Internet and Intranet have become widespread, demands for delivery of such video data through a network have grown.

Most of networks which have been widely available as local area networks are in the form of common type networks such as Ethernet. These networks use CSMA/CD (Carrier Sense Multiple Access with Collision Detection) system mainly, and hence show the characteristics that increases the transmission delay time exponentially as the amount of data transferred increases.

When video data are delivered in real time, it is necessary to maintain a constant transfer bit rate to ensure the continuity in delivery of video data. Even when using a common type network which causes a transmission delay dependent upon the amount of data, the transfer bit rate can be maintained by using a communications protocol designed specially for video data to surely ensure continuity in the delivery of video data.

However, when delivering video data using a common type network, a mixture of the video data and other available data may cause difficulty in keeping the transfer bit rate of video data because of the traffic of the other available data even though a mechanism for maintaining the transfer bit rate of video data is added to the system. In such a case, continuity in the delivery of video data can not be ensured surely, and interrupts and disturbances are caused during replay of video data transferred.

Therefore, it is necessary to provide a cable intended for delivery of video data to prevent the video data from being mixed with other available data, in addition to provision of a mechanism for maintaining the transfer bit rate of video data, to surely ensure continuity in the delivery of video data when delivering the video data in real time using a common type network.

A method of reducing the amount of video data to be delivered when the bandwidth of a network required for video data transmission cannot be ensured sufficiently is disclosed in Japanese Patent Application Laid Open (KOKAI) No. 7-75092. In accordance with this method, when compressing video data to be delivered through a network, the amount of data is reduced by changing a spatial frequency region used according to a load imposed on the network. In addition, to ensure a constant bandwidth, a local area network using TDM (Time Division Multiplexer) is utilized as the network.

Figure 9:
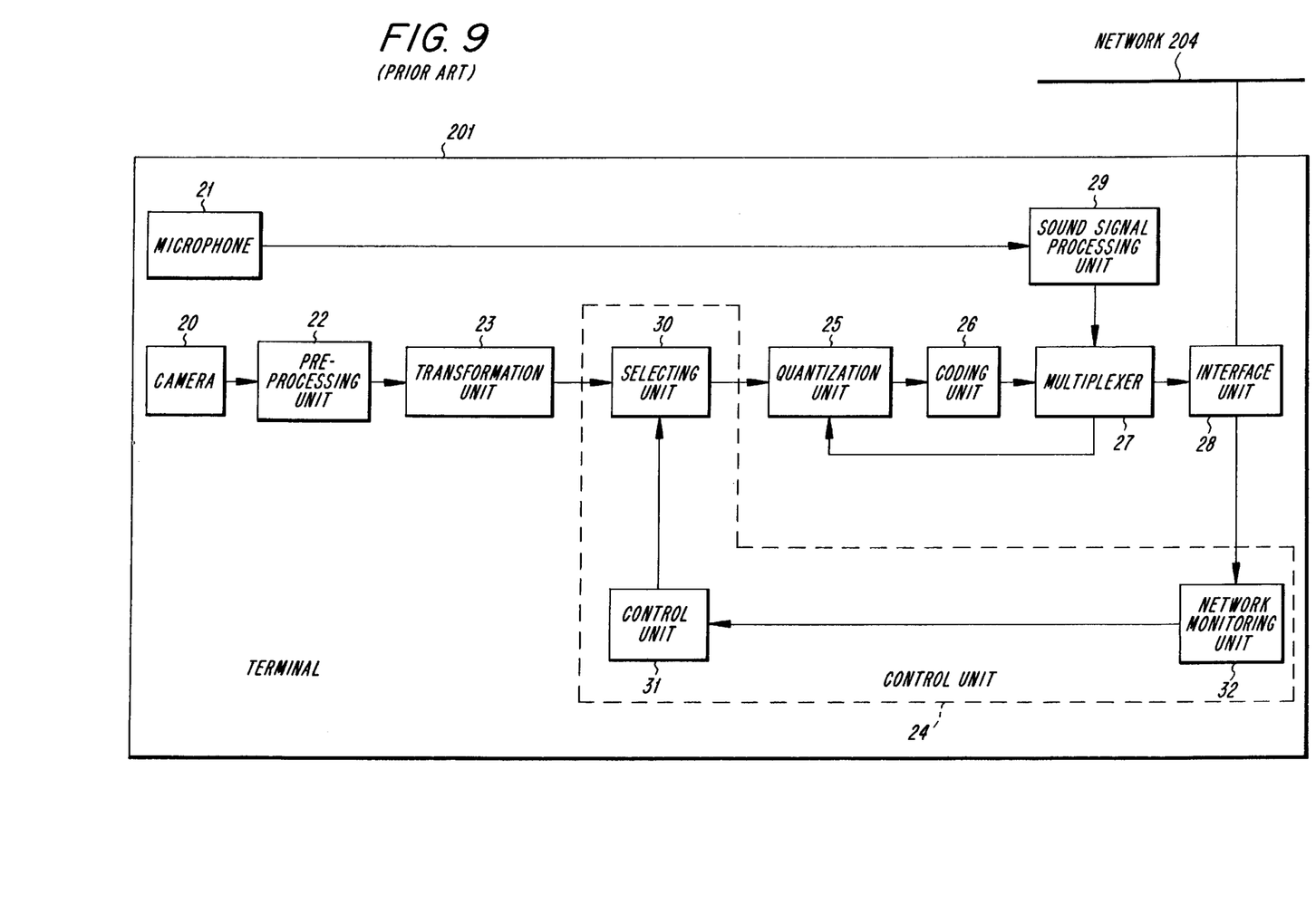
FIG. 9 is a block diagram of a prior art video data delivering system.

Referring now to FIG. 9, it illustrates a block diagram showing a prior art system for delivering video data which is applied to a network with CSMA/CD system, as disclosed in Japanese Patent Application Laid Open (KOKAI) No. 7-75092. In FIG. 9, reference numeral 201 denotes a terminal device, 204 denotes a network, 20 denotes a camera for inputting images, 22 denotes a pre-processing unit for, for example, digitizing an input signal, 23 denotes a discrete-cosine transformation unit, and 24 denotes a control unit for dynamically changing a spatial frequency. Furthermore, reference numeral 25 denotes a quantization unit, 26 denotes a variable-length coding unit, 21 denotes a microphone for generating an audio signal, 29 denotes a sound signal processing unit, 27 denotes an image/sound multiplexer, 28 denotes an interface unit between the terminal device and the network 204, 32 denotes a network monitoring unit, 31 denotes a control unit for controlling the upper limit of transmission frequency, and 30 denotes a unit for selecting transmission frequency components.

Next, a description will be made as to the operation. The pre-processing unit 22 and discrete cosine transforming unit 23 digitize and convert an image input through the camera 20 into components in the spatial frequency region. In accordance with a load imposed on the network 204 detected by the network monitoring unit 32, the transmission frequency upper limit controlling unit 31 and transmission frequency components selecting unit 30 judge and select frequency components to be transferred.

The quantization unit 25 quantizes the data about the range of frequency selected and the variable-length coding unit 26 encodes the quantized data into variable-length codes. The sound signal processing unit 29 digitizes an audio signal input through the microphone 21 and compresses corresponding digital data. The image/sound multiplexer 27 combines the data from the variable-length coding unit 26 and sound processing unit 29 to generate a set of video data using time division multiplexing technique. The interface unit 28 converts the video data signal into a form suitable for the network 204. Finally, the video data is delivered to the network 204.

Since the prior art video data delivering system having the structure mentioned above is based on the premise that video data input in real time and compressed are transmitted through a common type network such as Ethernet, there is a problem in that, when delivering video data compressed and stored at a constant bit rate, it is necessary to reproduce video data in a state previous to the compression and compress the video data again according to a load imposed on the network.

SUMMARY OF THE INVENTION

The present invention is made to overcome the aforementioned problem. More precisely, it is an object of the present invention to provide a system for, when delivering already compressed and stored video data through a network in which other available data can exist, adjusting the transfer bit rate of video data to be transmitted through the network in order to surely ensure continuity in the delivery of video data if the transfer bit rate cannot be maintained constant because of a high load imposed on the network and hence continuity in the delivery of video data cannot be ensured.

Furthermore, it is another object of the present invention to provide a system capable of eliminating the adverse effect of decreasing the transfer bit rate of other available data during delivery of video data.

In accordance with one aspect of the present invention, there is provided a system for delivering video data through a common type network including a video server which can deliver video data and a client which can receive and replay video data delivered thereto, the video server comprising: a video data index having video data index information required to set a transfer bit rate of video data to be delivered by the video server; a video data assembler for extracting data from an original video data by referring to the video data index information so as to set the transfer bit rate, and for reassembling the extracted data to create video data to be transferred at the set transfer bit rate to the client, while maintaining consistency in contents of the original video data; and a video data delivery unit for delivering a constant amount of data at certain intervals in accordance with the set transfer bit rate in order to transfer the video data reassembled by the video data assembler to the client, thereby making it possible for the client to replay the video data continuously.

In a preferred embodiment of the present invention, the video index information defines a plurality of settings for the transfer bit rate of video data and indicates which data included in the original video data the video server should transfer to the client when setting the transfer bit rate to one of the plurality of settings. Furthermore, the video data assembler extracts data from the original video data by referring to the video data index information so as to set the transfer bit rate to one of the plurality of settings.

The original video data can be compressed by using a predetermined compression method. Furthermore, the video data index information can indicate at least types, numbers, and positions on a time axis of data which are to be selected from the compressed original video data by the video data assembling means.

Preferably, the video server is adapted to analyze the original video data so as to create the video index information when the original video data are registered in the video server.

In a preferred embodiment of the present invention, the video server is adapted to determine a load imposed on the network, and the video data assembler selects and extracts data to be transferred from the original video data in accordance with a measurement result of the network load. The video data assembler can compare the measurement result of the network load to a reference value of the network load associated with the transfer bit rate set to one of the plurality of settings, and set the transfer bit rate to another of the plurality of settings on the basis of a comparison result as needed so as to increase or decrease the transfer bit rate.

Preferably, the network load is determined by measuring a time required for transfer of the reassembled video data to the client at certain intervals. Alternatively, a network load sensor can measure a load imposed on the network.

Instead of determining a load imposed on the network, the video server can determine a load imposed thereon, and the video data assembler can select and extract data to be transferred from the original video data in accordance with a measurement result of the video server load. The video data assembler compares the measurement result of the video server load to a reference value of the video server load associated with the transfer bit rate set to one of the plurality of settings, and sets the transfer bit rate to another of the plurality of settings on the basis of a comparison result as needed so as to increase or decrease the transfer bit rate.

In accordance with another aspect of the present invention, there is provided a system for delivering video data through a common type network including a video server which can deliver video data and a client which can receive and replay video data delivered thereto, wherein the video server comprises: a video data index having video data index information required to set a transfer bit rate of video data to be delivered by the video server; a video data assembler for extracting data from an original video data by referring to the video data index information so as to set the transfer bit rate, and for reassembling the extracted data to create video data to be transferred at the set transfer bit rate to the client, while maintaining consistency in contents of the original video data, and wherein the client comprises a precharge buffer for absorbing changes in the transfer bit rate of the video data delivered by the video server so as to prevent video data transferring services provided by the video server from being interrupted.

In a preferred embodiment of the present invention, the video index information defines a plurality of settings for the transfer bit rate of video data and indicates which data included in the original video data the video server should transfer to the client when setting the transfer bit rate to one of the plurality of settings. Furthermore, the video data assembler extracts data from the original video data by referring to the video data index information so as to set the transfer bit rate to one of the plurality of settings.

The original video data can be compressed by using a predetermined compression method. Furthermore, the video data index information can indicate at least types, numbers, and positions on a time axis of data which are to be selected from the compressed original video data by the video data assembling means.

Preferably, the video server is adapted to analyze the original video data so as to create the video index information when the original video data are registered in the video server.

In a preferred embodiment of the present invention, the client is adapted to determine a load imposed on the network, and the client informs the video server of a measurement result of the network load and the video data assembler selects and extracts data to be transferred from the original video data in accordance with the measurement result of the network load. The video data assembler compares the measurement result of the network load to a reference value of the network load associated with the transfer bit rate set to one of the plurality of settings, and sets the transfer bit rate to another of the plurality of settings on the basis of a comparison result as needed so as to increase or decrease the transfer bit rate.

Further objects and advantages of the present invention will be apparent from the following description of the preferred embodiments of the invention as illustrated in the accompanying drawings.

DETAILED DESCRIPTION OF THE PREFERRED EMBODIMENTS

A description will be made as to a first embodiment of the present invention with reference to FIGS. 1 through 4.

Figure 1:
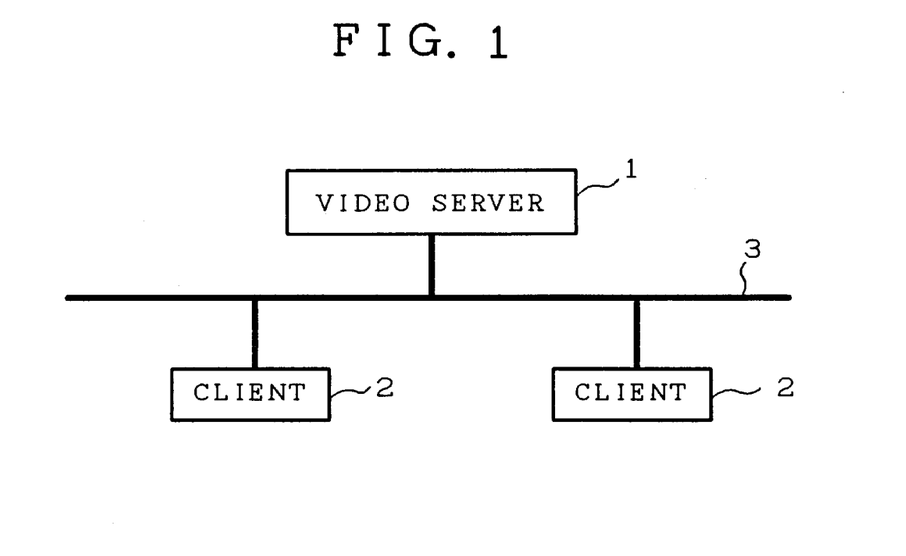
FIG. 1 is a block diagram showing a system for delivering video data according to the present invention.
Figure 2:
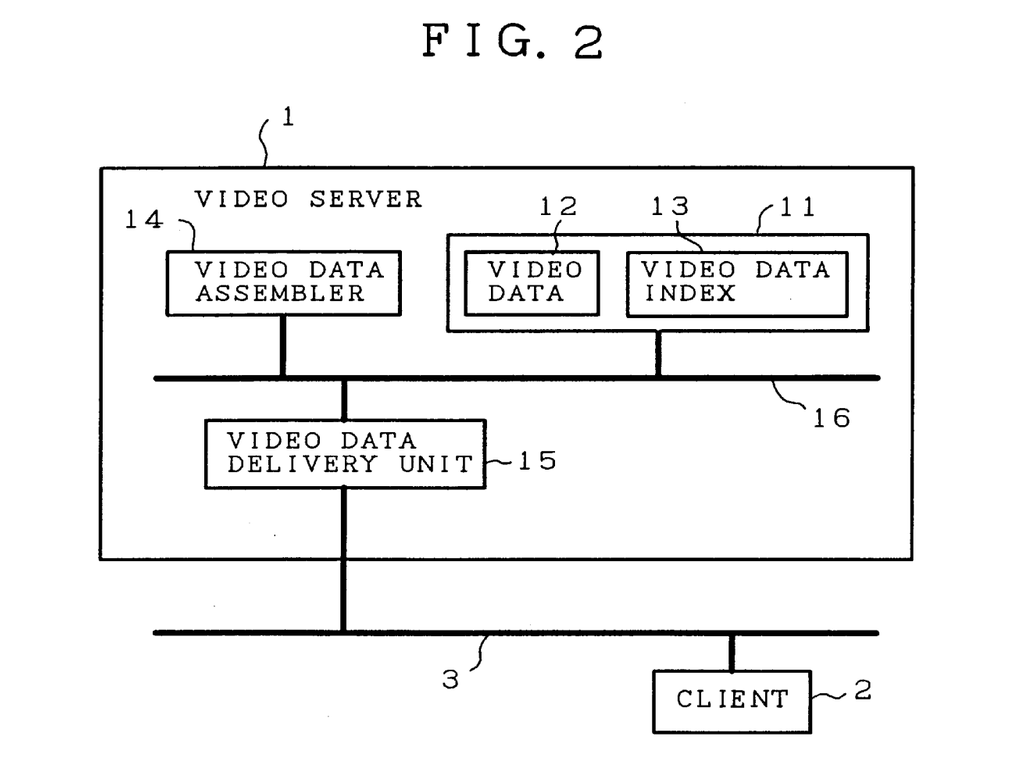
FIG. 2 is a block diagram of a video server according to a first embodiment of the present invention.
Figure 3:
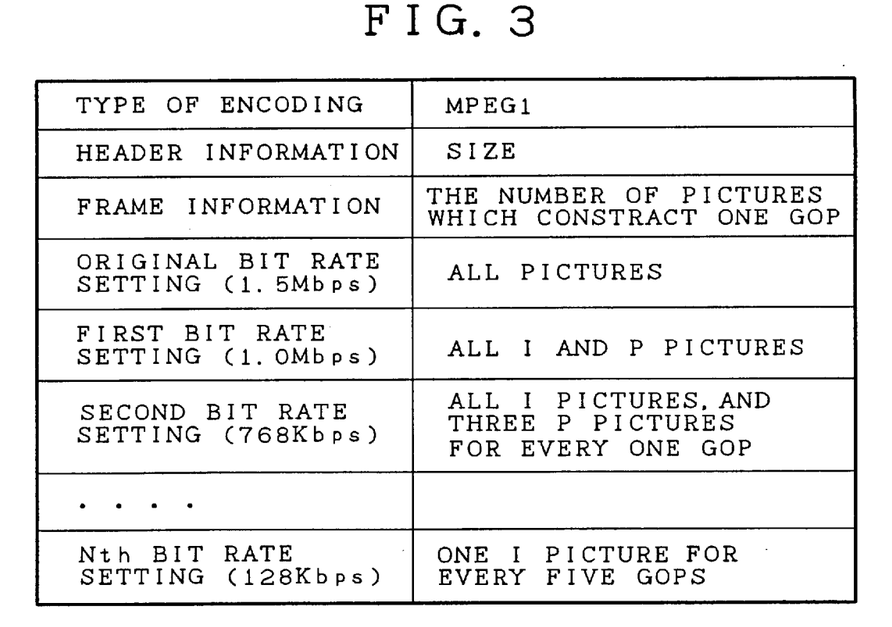
FIG. 3 is a view of a table of a video index according to the present invention.
Figure 4:
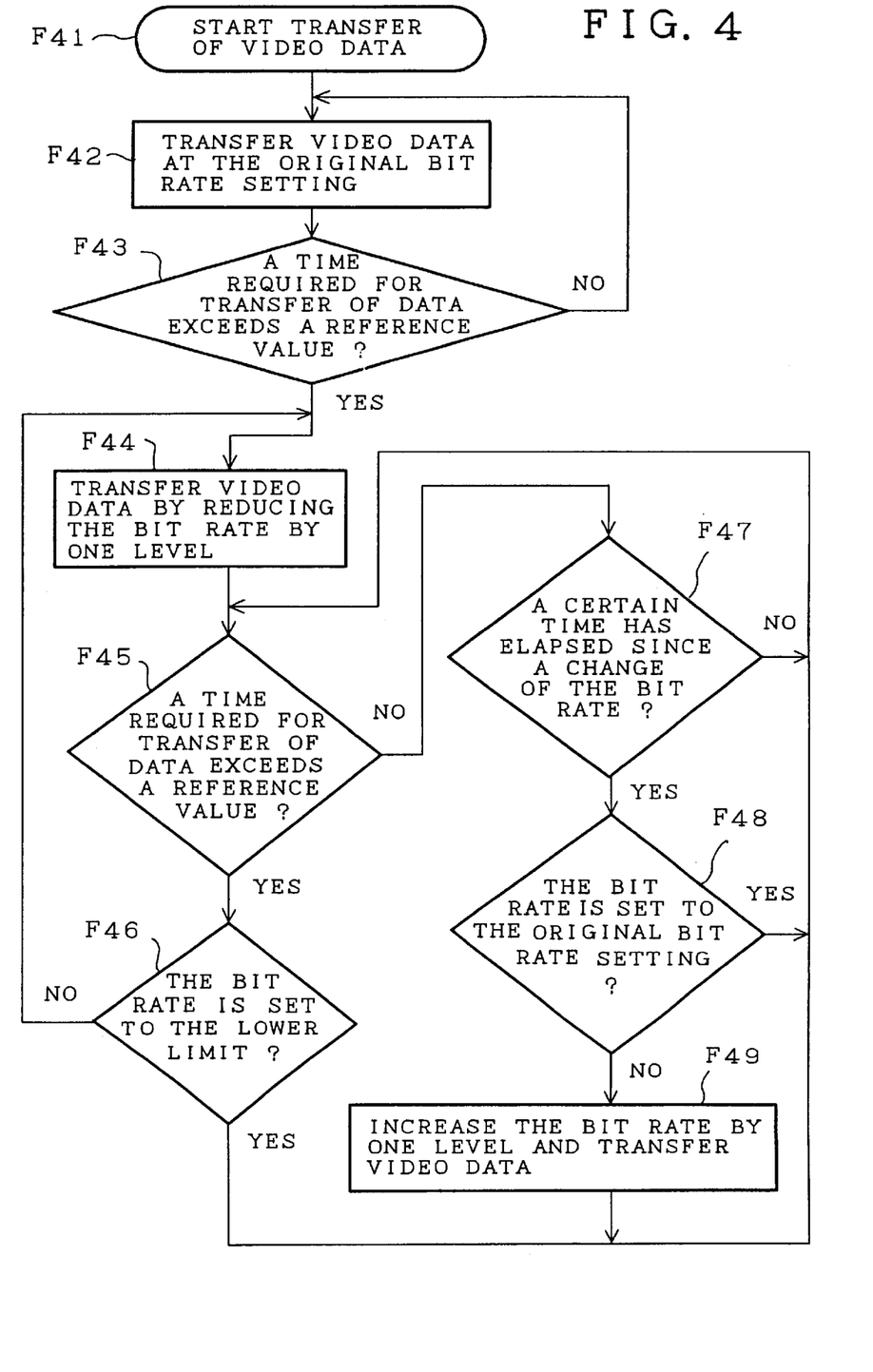
FIG. 4 is a flow diagram showing the operation of the first embodiment of the present invention.

FIG. 1 shows a block diagram showing the structure of a system for delivering video data according to the present invention, FIG. 2 shows a block diagram of a video server shown in FIG. 1, FIG. 3 shows a table showing an example of a video data index, and FIG. 4 shows a flow diagram showing the operation of a system of delivering video data according to the first embodiment. In FIGS. 1 and 2, reference numeral 1 denotes the video server, 2 denotes a client which can receive video data from the video server 1 and replay the video, and 3 denotes a common type network such as Ethernet.

The video server 1 delivers video data to the client 2 in response to a request of the client 2. The client 2 receives and replays the video data delivered thereto by the video server 1. In addition to the case where the client 2 receives video data from the video server 1, there may be cases where the client 2 receives or delivers data other than video data from or to another client.

In FIG. 2, reference numeral 11 denotes a video data database including the video data 12 and the video data index 13. The video data 12 are digital video data which are compressed by using a compression method such as MPEG1 and are to be delivered by the video server 1.

The video data index 13 is video data index information for describing parts which are selected from among the compressed video data 12 and are delivered actually, in order for the video server 1 to adjust the transfer bit rate at which the video data 12 are transmitted to the client 2 and deliver the video data without loss of the consistency in the contents of the video data.

Furthermore, reference numeral 14 denotes a video data assembler for extracting data in order to adjust the transfer bit rate from the video data 12 using the video data index 13 while maintaining the consistency in the contents of the video data, and for reassembling the extracted data to create video data to be transmitted at a transfer bit rate which can be different from the transfer bit rate of the original video data 12.

Reference numeral 15 denotes a video data delivery unit for delivering a constant amount of video data at constant intervals in accordance with the transfer bit rate of video data reassembled, and 16 denotes a bus through which data are exchanged between components within the video server 1.

The video data index 13 is created when the original video data 12 are registered in the video server 1. For example, when the video data are compressed in the form of MPEG1, each frame to be displayed is reconstructed from any one of three kinds of pictures, i.e., an I picture, a P picture, and a B picture. In the case of an I picture, each frame can be reconstructed from only an I picture. In the case of a P picture, each frame can be reconstructed from a previous I picture or a previous P picture as well as a P picture. In the case of a B picture, a previous I picture and a previous P picture are needed to reconstruct each frame as well as a B picture.

A plurality of picture sets each constructed of three kinds of pictures construct a group called GOP. FIG. 3 shows an example of the video data index when original video data compressed in the form of MPEG1 are registered in the video server. The video server 1 analyzes the original video data 12 to create the video data index 13 when registering the video data 12 in the video server. As shown in FIG. 3, the video data index defines a plurality of settings for the transfer bit rate of video data, an original bit rate, a 1st bit rate, a 2nd bit rate, . . . , and a nth bit rate, and indicates which data included in the original video data 12 the video server 1 should transfer to the client 2 when setting the transfer bit rate to one of the plurality of settings. More specifically, the video data index 13 indicates the types, numbers, and positions on a time axis of data which are to be selected from the compressed original video data by the video data assembler 14. In the example shown in FIG. 3, the types of pictures to be delivered and positions on a time axis of the pictures in the video data 12 are described for each of the plurality of bit rate settings. For example, all the pictures are delivered in the case of the original bit rate setting, and all the I and P pictures are delivered in the case of the first bit rate setting.

Next, a description will be made as to the video data transferring operation with reference to FIGS. 2 and 4.

In FIG. 2, the client 2 outputs a request for transfer of video data to the video server 1. When the video server 1 receives the transfer request from the client, the video server delivers a constant amount of data within a certain time in accordance with the transfer bit rate of video data so as to transfer the video data requested by the client through the video data delivering unit 15, in steps F41 and F42.

For example, when video data are transferred at a transfer bit rate of 1.5 Mbps, 64 Kbyte of data are delivered every 340 msec. If there is a margin of the load imposed on the network, the system can maintain the transfer bit rate of 1.5 Mbps for these delivery parameters. However, the video server cannot maintain the transfer bit rate if the load is increased. In order to resolve this problem, the video server starts to measure a time $T_r$ required for transfer of data at constant intervals $T_1$ so as to determine the load imposed on the network just after transfers of video data are started. Then, the video server, in steps F43 and 45, compares a measured value $T_r$ to a reference value $T_{d1}$, which is the maximum time required for transfer of data that cannot be exceeded in order to maintain the current transfer bit rate.

If the measured value $T_r$ exceeds the reference value $T_{d1}$, the video data assembler 14, in step F44, extracts all the I pictures and P pictures defined as video data to be transferred at the second transfer bit rate from the video data 12 so as to set the transfer bit rate to the second bit rate setting, modifies the header information in such a manner that the information shows that video data to be transferred are constructed of all the I and P pictures, and reassembles the extracted data to create video data to be transferred at the second transfer bit rate which is reduced from the original transfer bit rate by one level. The video data delivery unit 15 delivers the video data created at the new transfer bit rate while creating the video data rather than deliver all video data after they are created from the video data 12.

During transfers of video data, the video server continues to measure a time $T_r$ required for transfer of data at constant intervals $T_1$. When a measured value $T_r$ exceeds a reference value $T_d$ associated with the current transfer bit rate, the video data assembler 14 repeats the similar operation. The reference value is predetermined for each of the plurality of transfer bit rate settings described in the video data index 13. When the video data assembler 14 judges that it is necessary to transfer video data by reducing the transfer bit rate by one level, however, the current transfer bit rate is set to the lower limit of the settings described in the video data index, it continues to transfer the video data at the current transfer bit rate which remains unchanged, in step F46.

On the other hand, if measured values of the data transferring time $T_r$ are smaller than a reference value $T_d$ during a time $T_s$ after the transfer bit rate is changed, in step F47, the video data assembler 14, in step F49, extracts data to be transferred at a transfer bit rate which is increased from the current transfer bit rate by one level in accordance with the video data index so as to increase the current bit rate and reassembles the extracted data to create video data. Then, the video data delivery unit 15 delivers the video data. For example, when the current transfer bit rate is increased by one level from the second bit rate to the first bit rate as described in the video data index, the video data assembler 14 extracts all the I pictures and P pictures from the video data 12, modifies the header information, and reassembles the extracted data to create video data to be transferred through the video data delivery unit 15. In this case, since the new transfer bit rate for the video data created is 1 Mbps, as shown in FIG. 3, the video data delivery unit delivers 64 Kbytes of data every 512 msec. If the video data assembler 14, in step F48, judges that it is necessary to increase the transfer bit rate by one level, however, the current bit rate has been already set to the original bit rate setting, the video server continues to transfer the video data at the current bit rate which remains unchanged.

The video server repeats the above-mentioned successive operations such as measurements of the data transferring time, and increasing and decreasing the transfer bit rate until it delivers all video data needed in order for the client to replay the original video data 12 while maintaining the consistency in the contents of the video data.

A description will be made as to a second embodiment of the present invention with reference to FIGS. 5 and 6.

Figure 5:
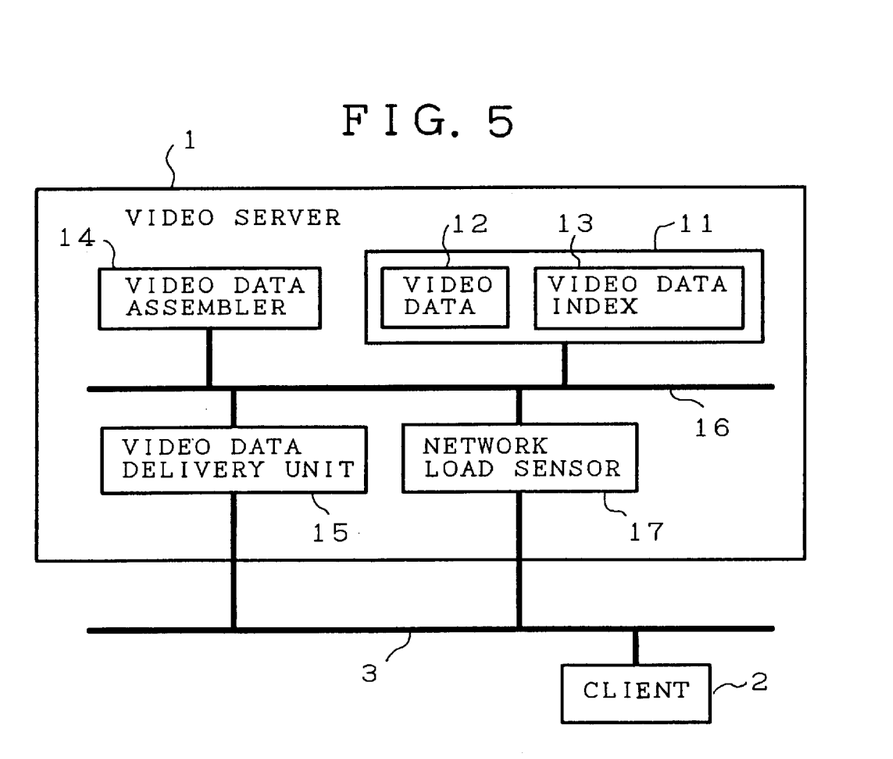
FIG. 5 is a block diagram of a video server according to a second embodiment of the present invention.
Figure 6:
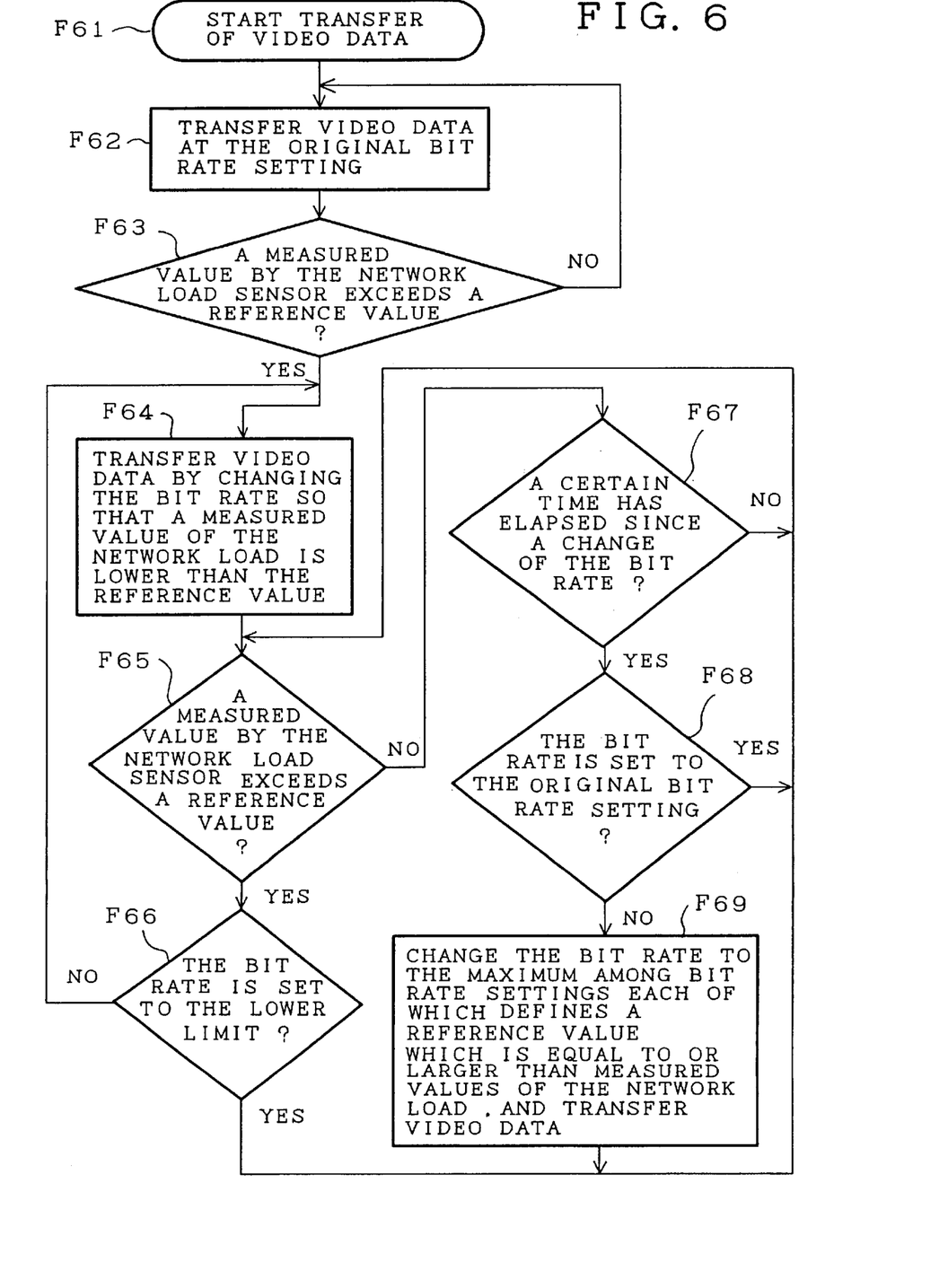
FIG. 6 is a flow diagram showing the operation of the second embodiment of the present invention.

FIG. 5 shows a block diagram of the video server 1 according to the second embodiment. In FIG. 5, reference numeral 17 denotes a network load sensor for detecting a load imposed on the network. The other components are the same as those designated by the same reference numerals shown in FIG. 2.

Next, a description will be made as to the video data transferring operation with reference to FIGS. 3, 5 and 6.

In FIG. 5, the client 2 outputs a request for transfer of video data to the video server 1. When the video server receives the transfer request from the client, the video server delivers a constant amount of data within a certain time in accordance with the transfer bit rate of video data so as to transfer the video data requested by the client through the video data delivering unit 15, in steps F61 and F62.

The video server, in step F63, starts to measure a load $L_n$ imposed on the network at constant intervals $T_1$ by means of the network load sensor 17 just after transfers of video data are started. Then, the video server compares a measured value $L_n$ of the network load to a reference value $L_{d1}$, which is the maximum of the network load that cannot be exceeded in order to maintain the current transfer bit rate.

If the measured value $L_n$ exceeds the reference value $L_{d1}$, the video data assembler 14, in step F64, selects a bit rate setting which can cause a measured value $L_n$ to become lower than the reference value $L_{d1}$ from the video data index 13. The video data assembler 14 further extracts pictures from the video data 12 in accordance with the bit rate setting selected from the video data index, modifies the header information, and reassembles the extracted data to create video data to be transferred at the selected bit rate which is smaller than the current transfer bit rate. Then, the video data delivery unit 15 delivers the video data created at the new transfer bit rate. The reassembling of video data to be transferred at the reduced transfer bit rate and transfer of video data are carried out in parallel. The video data delivery unit 15 delivers a constant amount of data at certain intervals so as to maintain the current transfer bit rate when transferring video data. After that, the video data assembler 14, in step F65, continues to determine whether or not a measured value $L_n$ of the network load exceeds a reference value $L_d$, which is associated with the current transfer bit rate set to one of the plurality of bit rate settings. And, every when a measured value $L_n$ of the network load exceeds the corresponding reference value $L_d$, the video data assembler 14 changes the bit rate in the same manner. The reference value $L_d$ is defined for each of the plurality of transfer bit rate settings.

When the measured value $L_n$ exceeds the reference value $L_d$, the video data assembler 14 checks whether or not the current transfer bit rate is set to the lower limit of the plurality of transfer bit rate settings described in the video data index. If the current transfer bit rate is the lower limit, the video data assembler 14, in step F68, continues to transfer video data at the current transfer bit rate which remains unchanged.

On the other hand, if measured values $L_n$ are smaller than the reference value $L_d$ during a predetermined time $T_s$ after the transfer bit rate was changed in step F67, the video data assembler 14, in step F69, selects the maximum from among transfer bit rate settings defining reference values $L_d$ which are equal to or larger than the measured values $L_n$ obtained after the previous change of the bit rate was completed and reassembles data extracted to create video data to be transferred at the selected bit rate in the aforementioned manner. Then, the video data delivery unit 15 delivers the video data. Before performing step F69, the video data assembler, in step F68, determines whether or not the current bit rate is set to the original bit rate setting. If the current bit rate is set to the original bit rate setting, the video server continues to transfer the video data at the current bit rate which remains unchanged.

The video server repeats the above-mentioned successive operations such as measurements of the data transferring time, and increasing and decreasing the transfer bit rate until it delivers all video data needed in order for the client to replay the original video data 12 while maintaining the consistency in the contents of the video data.

A description will be made as to a third embodiment of the present invention with reference to FIG. 7.

Figure 7:
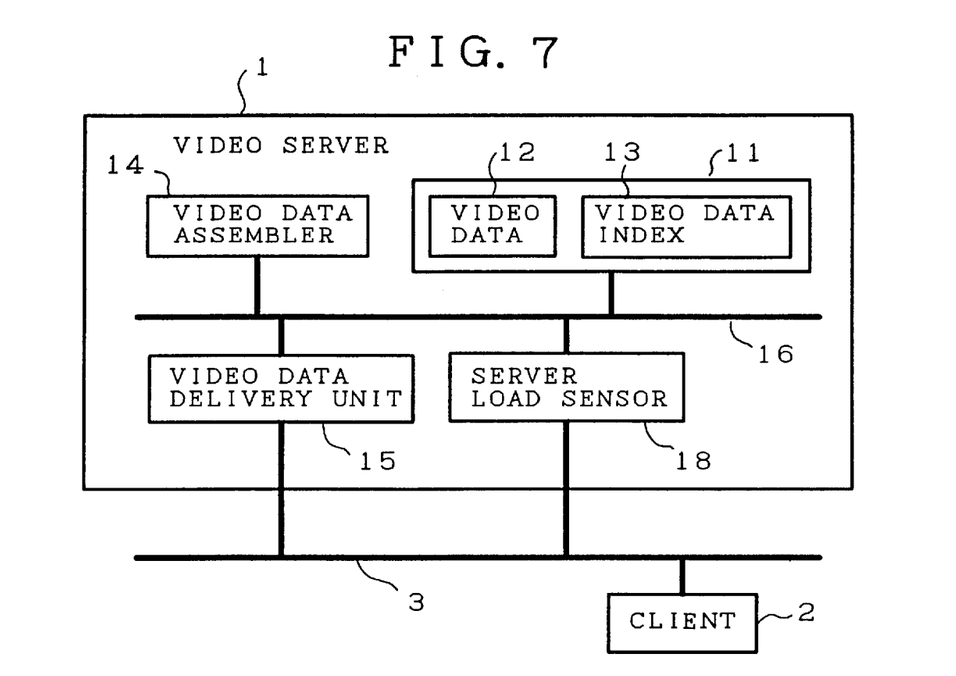
FIG. 7 is a block diagram of a video server according to a third embodiment of the present invention.

FIG. 7 shows a block diagram of the video server according to this embodiment. In the figure, reference numeral 18 denotes a server load sensor for detecting a load imposed on the video server. The other components are the same as those designated by the same reference numerals shown in FIG. 2.

Next, a description will be made as to the operation. The video server according to this embodiment measures a load imposed on the video server by means of the server load sensor 18 instead of measuring a time $T_r$ required for transfer of data at constant intervals T1, as described in the first embodiment.

Furthermore, in this embodiment, the video server is adapted to perform similar operations like the first embodiment, by replacing reference values $T_d$ of a time required for transfer of data as mentioned in the first embodiment with reference values $L_d$ of a load imposed on the video server, which are respectively associated with a plurality of transfer bit rate settings defined in the video data index 13.

Figure 8:
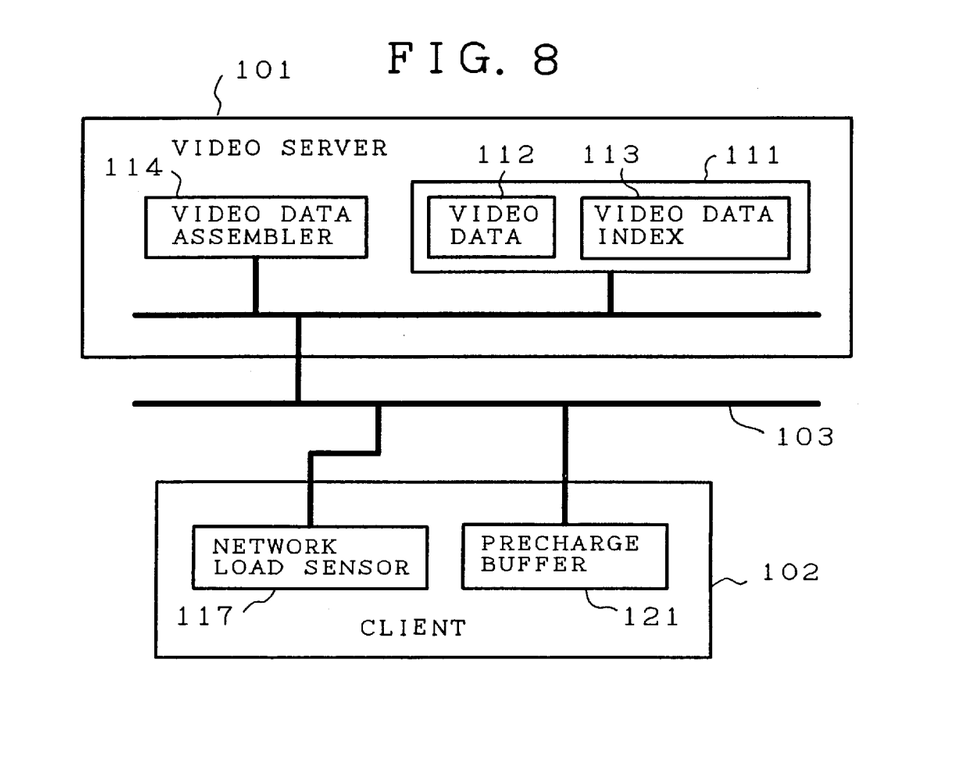
FIG. 8 is a block diagram of a video data delivering system according to a fourth embodiment of the present invention.

A description will be made as to a fourth embodiment of the present invention with reference to FIG. 8. FIG. 8 shows a block diagram of a system for delivering video data according to the fourth embodiment. In FIG. 8, reference numeral 111 denotes a video database constructed by video data 112 to be transferred by a video server 101 and a video data index 113 including index information for indicating parts which are selected from the video data 112 and are delivered actually.

Furthermore, reference numeral 114 denotes a video data assembler adapted to extract data required to adjust the transfer bit rate from the original video data 112 while maintaining the consistency of the contents of the original video data, and reassemble the extracted data to create video data to be transferred. For example, in the case that the video data 112 are compressed in the form of MPEG1, information about the frame structure such as the type of encoding, the size of the header, the size of frames, and the number of pictures which construct GOP, the types and numbers of pictures to be extracted which are predetermined for each of a plurality of transfer bit rate settings, and the positions on a time axis of the pictures within the video data 12 are described in the video data index 13 when the video data are registered in the video server. Furthermore, picture degradation in the video data followed by a change in the transfer bit rate is prevented by determining the types and numbers of pictures to be extracted for each of the plural bit rate settings by assigning a weight to each of pictures which construct a GOP in accordance with the contents of the video data every when registering the video data. That is, the structure of the video data assembler 114 is the same as that of the video data assembler 14 according to the aforementioned embodiments, and the contents of the video data index 113 are similar to those of the video data index 13 according to the aforementioned embodiments.

Reference numeral 117 denotes a network load sensor for detecting a load imposed on a network 103, and 121 denotes a precharge buffer, which is a component of the client 102, for absorbing changes in the transfer bit rate of video data delivered by the video server 101 so as to prevent video data transferring services provided by the video server 101 from being interrupted.

Next, a description will be made as to the video data transferring operation in the fourth embodiment. First, the client 102 outputs a request for transfer of video data to the video server 101. When the video server 101 receives the transfer request from the client, the video server transfers the video data requested by the client 102 to the client. The client 102 stores the video data delivered by the video server in the precharge buffer 121, and then starts to replay the video data. After that, the client continues to store video data received in the precharge buffer and read the video data to be replayed from the precharge buffer. Thus, even though transfer of video data from the video server is delayed, the client can maintain the continuity in video replay by absorbing changes in the transfer bit rate of video data by utilizing video data stored in the precharge buffer.

The network load sensor 117 starts to measure a load $L_n$ imposed on the network at constant intervals $T_1$ just after transfers of video data are started. Then, the network load sensor 117 compares the measured network load $L_n$ to a reference value $L_d$. If the measured value $L_n$ exceeds the reference value $L_d$, the client 102 sends a request to reduce the transfer bit rate to the video server 101. When the video server 101 receives the request to change the bit rate, the video data assembler 114 extracts pictures from the video data 112 in accordance with the video data index 113, modifies the header information, and reassembles the extracted data to create video data to be transferred at a bit rate which is reduced from the previous bit rate by one level from the video data 12. Then, the video server delivers the video data.

If it is necessary to reduce the bit rate by one level, however, the current transfer bit rate is set to the lower limit of the plural transfer bit rate settings defined in the video data index 113, the video server continues to transfer video data at the current transfer bit rate which remains unchanged.

After that, every when a measured value $L_n$ exceeds the reference value $L_d$ associated with the current transfer bit rate, the client sends a request to reduce the bit rate to the video server and the video server repeats similar operations to reassemble data extracted to create video data to be transferred at a bit rate which is reduced from the previous bit rate by one level and then deliver the video data.

On the other hand, if measured values $L_n$ are smaller than the reference value $L_d$ during a time $T_s$ after the transfer bit rate was changed, the client sends a request to increase the transfer bit rate to the video server. When the video server receives the request to change the bit rate, the video data assembler 114 extracts pictures from the video data 112 in accordance with the video data index 13, modifies the header information, and reassembles the extracted data to create video data to be transferred at a bit rate which is increased from the previous bit rate by one level. Then, the video server delivers the video data. If it is necessary to increase the transfer bit rate by one level, however, the current bit rate is set to the original bit rate setting, the video server continues to transfer the video data at the current bit rate which remains unchanged.

The client and video server repeat the above-mentioned successive operations such as detection of a load imposed on the network, and increasing and decreasing the transfer bit rate until it delivers all video data needed in order for the client to replay the original video data 112 while maintaining the consistency in the contents of the video data.

As previously mentioned, in accordance with the present invention, since there is provided a video server which dynamically changes the transfer bit rate in response to a load imposed on a resource such as a network or the video server when delivering video data, the present invention offers an advantage in its capability to maintain the continuity in video data to be delivered even though the video server delivers video data through a common type network in which the video data and other available data may be mixed and a certain bandwidth cannot be ensured in advance.

Furthermore, the present invention provides an advantage in eliminating an adverse effect on transfers of other available data when delivering video data which may exist together with the other available data in the network.

Many widely different embodiments of the present invention may be constructed without departing from the spirit and scope of the present invention. It should be understood that the present invention is not limited to the specific embodiments described in the specification, except as defined in the appended claims.

What is claimed is:

1. A system for delivering video data through a common type network including a video server which can deliver video data and a client which can receive and replay video data delivered thereto, said video server comprising:

means for storing video index information corresponding to an original video data required to set a transfer bit rate of video data to be delivered by said video server;

video data assembling means for extracting data from the original video data by referring to said video data index information so as to set the transfer bit rate, and for reassembling the extracted data to create video data to be transferred at the set transfer bit rate to said client, while maintaining consistency in contents of the original video data; and video data delivery means for delivering a constant amount of data at certain intervals in accordance with the set transfer bit rate in order to transfer the video data reassembled by said video data assembling means to said client, thereby making it possible for said client to replay the video data continuously.

2. The system according to claim 1, wherein said video index information defines a plurality of settings for the transfer bit rate of video data and indicates which data included in the original video data said video server should transfer to said client when setting the transfer bit rate to one of said plurality of settings, and wherein said video data assembling means extracts data from said original video data by referring to said video data index information so as to set the transfer bit rate to one of said plurality of settings.

3. The system according to claim 2, wherein said original video data are compressed by using a predetermined compression method, and wherein said video data index information indicates at least types, numbers, and positions on a time axis of data which are to be selected from the compressed original video data by said video data assembling means.

4. The system according to claim 2, wherein said video server comprises a network load measuring means for determining a load imposed on said network, and wherein said video data assembling means selects and extracts data to be transferred from said original video data in accordance with a measurement result of the network load by said network load measuring means.

5. The system according to claim 4, wherein said video data assembling means compares the measurement result of the network load to a reference value of the network load associated with the transfer bit rate set to one of said plurality of settings, and sets the transfer bit rate to another of said plurality of settings on the basis of a comparison result as needed so as to increase or decrease the transfer bit rate.

6. The system according to claim 4, wherein said network load measuring means is a means for measuring a time required for transfer of the reassembled video data to said client at certain intervals.

7. The system according to claim 4, wherein said network load measuring means is a network load sensor for measuring a load imposed on said network.

8. The system according to claim 2, wherein said video server comprises a server load measuring means for determining a load imposed on said video server, and wherein said video data assembling means selects and extracts data to be transferred from said original video data in accordance with a measurement result of the video server load by said server load measuring means.

9. The system according to claim 8, wherein said video data assembling means compares the measurement result of the video server load to a reference value of the video server load associated with the transfer bit rate set to one of said plurality of settings, and sets the transfer bit rate to another of said plurality of settings on the basis of a comparison result as needed so as to increase or decrease the transfer bit rate.

10. The system according to claim 1, wherein said video server further comprises a video data analyzing means for analyzing said original video data so as to create said video index information when said original video data are registered in said video server.

11. The system according to claim 1, wherein said video server comprises a network load measuring means for determining a load imposed on said network, and wherein said video data assembling means selects and extracts data to be transferred from said original video data in accordance with a measurement result of the network load by said network load measuring means.

12. The system according to claim 1, wherein said video server comprises a server load measuring means for determining a load imposed on said video server, and wherein said video data assembling means selects and extracts data to be transferred from said original video data in accordance with a measurement result of the video server load by said server load measuring means.

13. A system for delivering video data through a common type network including a video server which can deliver video data and a client which can receive and replay video data delivered thereto, wherein said video server comprises:

means for storing video index information corresponding to an original video data required to set a transfer bit rate of video data to be delivered by said video server; and video data assembling means for extracting data from the original video data by referring to said video data index information so as to set the transfer bit rate, and for reassembling the extracted data to create video data to be transferred at the set transfer bit rate to said client, while maintaining consistency in contents of the original video data, and wherein said client comprises:

precharge buffer for absorbing changes in the transfer bit rate of the video data delivered by said video server so as to prevent video data transferring services provided by said video server from being interrupted.

14. The system according to claim 13, wherein said video index information defines a plurality of settings for the transfer bit rate of video data and indicates which data included in the original video data said video server should transfer to said client when setting the transfer bit rate to one of said plurality of settings, and wherein said video data assembling means extracts data from said original video data by referring to said video data index information so as to set the transfer bit rate to one of said plurality of settings.

15. The system according to claim 14, wherein said original video data are compressed by using a predetermined compression method, and wherein said video data index information indicates at least types, numbers, and positions on a time axis of data which are to be selected from the compressed original video data by said video data assembling means.

16. The system according to claim 12, wherein said client comprises a network load measuring means for determining a load imposed on said network, and wherein said client informs said video server of a measurement result of the network load and said video data assembling means selects and extracts data to be transferred from said original video data in accordance with the measurement result of the network load by said network load measuring means.

17. The system according to claim 16, wherein said video data assembling means compares the measurement result of the network load to a reference value of the network load associated with the transfer bit rate set to one of said plurality of settings, and sets the transfer bit rate to another of said plurality of settings on the basis of a comparison result as needed so as to increase or decrease the transfer bit rate.

18. The system according to claim 13, wherein said video server further comprises a video data analyzing means for analyzing said original video data so as to create said video index information when said original video data are registered in said video server.

19. The system according to claim 13, wherein said client comprises a network load measuring means for determining a load imposed on said network, and wherein said client informs said video server of a measurement result of the network load and said video data assembling means selects and extracts data to be transferred from said original video data in accordance with the measurement result of the network load by said network load measuring means.

* * * * *